(12) United States Patent
Volker et al.

(10) Patent No.: US 9,212,939 B2
(45) Date of Patent: Dec. 15, 2015

(54) FLUID FLOW METER USING THERMAL TRACERS

(75) Inventors: Arno Willem Frederik Volker, Delft (NL); Leon Ferdinand Gerard Geers, Valkenburg (NL); Huibert Blokland, Noordeloos (NL); Theodoor Peter Martijn Hunter, Barendrecht (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 657 days.

(21) Appl. No.: 12/935,738

(22) PCT Filed: Apr. 2, 2009

(86) PCT No.: PCT/NL2009/050171
§ 371 (c)(1),
(2), (4) Date: Dec. 23, 2010

(87) PCT Pub. No.: WO2009/123455
PCT Pub. Date: Oct. 8, 2009

(65) Prior Publication Data
US 2011/0087447 A1    Apr. 14, 2011

(30) Foreign Application Priority Data
Apr. 2, 2008 (EP) .................................. 08153980

(51) Int. Cl.
*G01F 1/688* (2006.01)
*G01F 1/704* (2006.01)
*G01F 1/708* (2006.01)

(52) U.S. Cl.
CPC ................ *G01F 1/688* (2013.01); *G01F 1/708* (2013.01); *G01F 1/7044* (2013.01); *G01F 1/7082* (2013.01); *G01F 1/7084* (2013.01)

(58) Field of Classification Search
CPC ............................... G01F 1/7044; G01F 1/688
USPC ............................................................ 702/49
See application file for complete search history.

(56) References Cited

U.S. PATENT DOCUMENTS 4,331,025 A * 5/1982 Ord, Jr. ........................ 73/54.01
4,342,232 A * 8/1982 Calvet et al. ................ 73/861.05
(Continued)

FOREIGN PATENT DOCUMENTS

EP    1 014 093    6/2000
EP    1 921 425    5/2008
(Continued)

OTHER PUBLICATIONS

Roetsch, Patrice, "International Search Report" International Application No. PCT/NL2009/050171, issued on Jun. 8, 2009 (2 pages).

*Primary Examiner* — Janet Suglo
*Assistant Examiner* — Yaritza H Perez Bermudez
(74) *Attorney, Agent, or Firm* — Fish & Richardson P.C.

(57) ABSTRACT

Fluid flows through a conduit. To measure flow speed the fluid is heated at a heating location in the conduit with a time-dependent heating strength. A speed of sound in fluid flowing in the conduit is measured at a plurality of sensing locations downstream from said heating location. The flow speed of the fluid is determined from a delay with which the time dependence is detected in the sound speeds measured at said sensing locations. In an embodiment a frequency of the variation of heating strength that is used to determine the flow speed is selected automatically dependent on the flow speed and/or other circumstances.

9 Claims, 2 Drawing Sheets

(56) References Cited

U.S. PATENT DOCUMENTS

| | | |
|---|---|---|
| 6,119,070 A | 9/2000 | Beneteau et al. |
| 6,169,965 B1 * | 1/2001 | Kubisiak et al. ............... 702/136 |
| 2005/0005710 A1 | 1/2005 | Sage, Jr. |
| 2005/0203977 A1 * | 9/2005 | Schenk ............................ 708/200 |
| 2008/0210002 A1 * | 9/2008 | Kamiunten et al. ........ 73/204.23 |
| 2009/0025473 A1 | 1/2009 | Imai et al. |
| 2010/0000333 A1 * | 1/2010 | Volker et al. ................ 73/861.95 |

FOREIGN PATENT DOCUMENTS

| | | | |
|---|---|---|---|
| JP | 2001-272261 | 10/2001 | ............... G01F 1/712 |
| JP | 2006-145212 | 6/2006 | ................ G01P 5/10 |
| JP | 2007/248118 | 9/2007 | ................ G01P 5/18 |

* cited by examiner

FLUID FLOW METER USING THERMAL TRACERS

CROSS REFERENCE TO RELATED APPLICATIONS

This application claims the benefit under 35 U.S.C. Section 371, of PCT International Application Number PCT/NL2009/50171, filed Apr. 2, 2009, entitled "Fluid flow meter".

FIELD OF THE INVENTION

The invention relates to a fluid flow meter and to a method of measuring fluid flow.

BACKGROUND

It is known to measure fluid flow using thermal time of flight. In a thermal time of flight measurement the fluid is heated locally. Subsequently, the temperature is measured at different positions to detect how fast a locally heated fluid element is transported by flow of the fluid. In the known measurement the fluid flows through a conduit and temperature sensors attached to the wall of the conduit, or inside the conduit, are used to measure temperature of fluid that is in contact with the sensors. This method of measuring has the disadvantage that the measurement result partly depends on the relation between conduit properties and fluid properties other than flow speed. With decreasing conduit size and flow speed these other dependences increasingly affect the accuracy of the measurement.

Another known fluid flow measuring technique is ultrasonic time of flight measurement. In this technique measurements are made of the time intervals needed to pass ultrasound a certain distance against the flow and along the flow respectively. Flow speed can be computed from the difference between the measured time intervals and the distance travelled by the sound. Due to limitations on time measurement this technique is only accurate for sufficiently high flow speed.

In PCT patent application No PCT 2007/NL050550, which was unpublished at the time of filing the present patent application it is described that fluid flow may be measured by heating the fluid with a laser with a heating pattern that sinusoidally depends on time and detecting the time of flight from downstream measurements of sound speed in the fluid.

SUMMARY

From US patent application No. 2005/0005710 is known to measure flow speed by applying a heating pulse to a fluid and detecting time of flight from downstream measurements of the speed of light in the fluid. However, this pulsed measurement does not allow for measurements of very small flows, because these cannot be distinguished from diffusion.

EP 1014093 discloses measurement of flow speed by heating a fluid and determining the delay time with which a resulting temperature change is detected at temperature sensors at different positions along a conduit. Use for small flow speeds is mentioned and an application to household equipment such as washing machines is described, wherein the smallest flow speeds are well above $10^{-2}$ m/sec. Use of periodical and stochastic heating patterns is described. When a periodical heating pattern is used, phase differences between detected temperature variations are used to measure the delay time. However, such a measurement conventionally requires a number of periods of the periodical heating pattern. When a stochastic heating pattern is used, correlation is used to determine the delay. Correlation also requires measurement time. In both cases reliable measurement may take considerable time in the case of low flow speeds.

Among others, it is an object of the invention to provide for a fluid flow meter and a method of measuring fluid flow speed that has little or no dependence on fluid properties than flow speed and is suitable at least for low flow speeds.

It has been found that it is possible to measure flow speeds up from very small flow speeds of in a range of $10^{-4}$ meter per second to $10^{-2}$ meter per second by heating the fluid in the conduit with a time-dependent heating strength that comprises a heating pattern that sinusoidally depends on time. According to one aspect a measurement of flow speed is performed by applying a fluid flow to a conduit;

heating the fluid at a heating location in the conduit with a time-dependent heating strength using a plurality of heating patterns of respective different frequency simultaneously;

remotely measuring measure a local property of the fluid that is dependent on local temperature of the fluid in fluid flowing in the conduit at a plurality of sensing locations downstream from said heating location;

computing phase and amplitude values of frequency components of variations of the property in a time interval for the respective different frequencies iteratively, with successive iterations to estimate corrections of the compute phase and amplitude values from measurements of the property from which estimates of the components obtained from a previous iteration have been subtracted, and determining flow speed from differences between the phase values computed for a selected one of the frequencies or a selected range of the frequencies for respective ones of the sensing locations. This makes it possible to perform temperature measurement much faster than with contact based temperature measurement, without a need for contact with the heated fluid. The property may be a speed of sound in the fluid.

In an embodiment the fluid is heated locally in the conduit at a location away from the wall of the conduit through which the fluid flows. This makes it possible to eliminate the effect of the walls on heating. A laser, focussed or at least convergent in said location may be used for example, or a microwave heating source, or a heater wire etc.

BRIEF DESCRIPTION OF THE DRAWINGS

These and other aspects and advantageous aspects of the invention will become apparent from a description of exemplary embodiments, using the following figures

DETAILED DESCRIPTION

Figure 1:
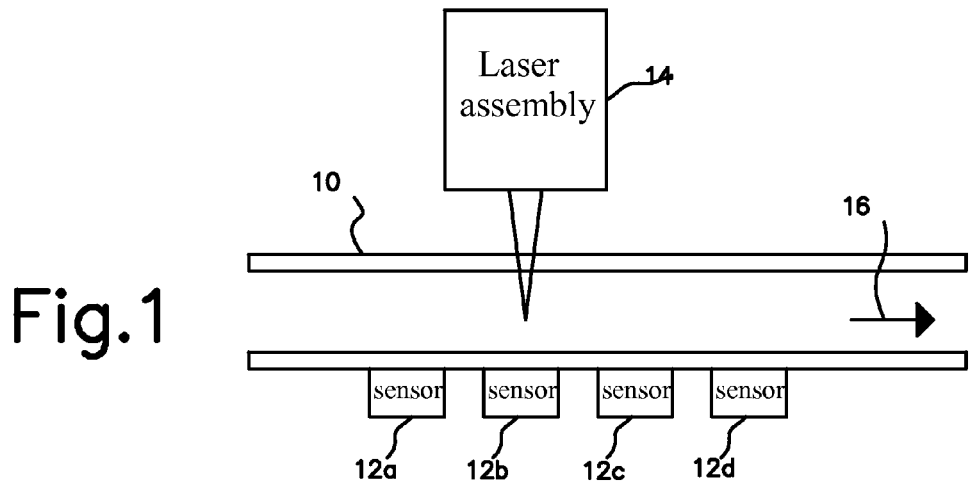
FIG. 1 shows a flow speed measurement arrangement

FIG. 1 shows a flow speed measurement arrangement comprising a conduit 10, a series of sensors 12a-d attached to the wall of conduit 10, and a laser assembly 14. Laser assembly 14 is focussed at a focus region within conduit 10 adjacent one of the sensors 12a-d at a second position in the series. The focus region lies apart from the wall of conduit 10, i.e. part of the space within the wall surrounds the focus region and is not part of it.

In operation, fluid flows through conduit 10 in a direction indicated by an arrow 16, past successive ones of sensors 12a-d and through the focus region where laser assembly 14 is focussed. In an embodiment the diameter of conduit is selected so that in a range of possible flow speeds laminar flow profile occurs. In this embodiment laser assembly 14 is preferably focussed at a point where maximum flow occurs in the profile, or at least at a point where the flow speed does not deviate from the maximum of the profile by more than a predetermined fraction of for example ten percent.

Laser assembly 14 is activated to generate laser generation with a time dependent intensity, such as an intensity pulse or sinusoidally varying intensity. The wavelength of the radiation is selected so that at least part of the radiation from the laser pulse will be absorbed by the fluid, with the result that the fluid is heated locally. As the fluid moves through conduit 10, different fluid portions that pass through the focus region are heated to a varying degree. The heated fluid portions moves through conduit 10 along sensors 12c-d as a result of the flow.

The operation may be realized in very narrow conduits 10. In an embodiment a conduit of one millimeter diameter was used. Of course, larger diameters of for example 10 millimeters may also be used. Also smaller diameters may be used, although a lower limit is imposed by the focus size during heating.

Figure 2:
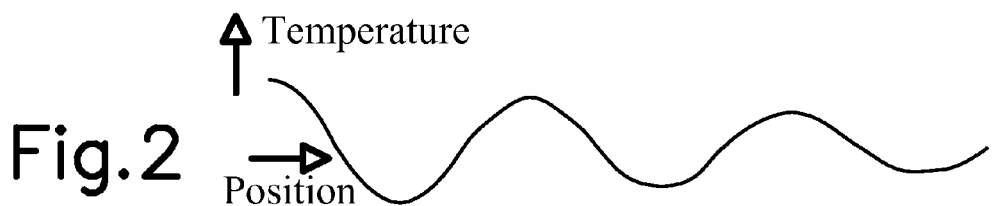
FIG. 2 shows temperature as a function of position

FIG. 2 shows a theoretical temperature of the fluid as a function of position along a virtual line through conduit 10 along the direction of flow, when the fluid is heated using a laser radiation intensity with a sinusoidal time dependence. A sinus-like pattern arises because different moving fluid portions are successively heated to a varying degree with the sinusoidal time dependence. The amplitude of the sinus-like pattern decays with distance from the focus region, due to heat diffusion effects.

Sensors 12a-d are sound speed sensors and preferably ultra-sonic sensors, which are known per se, and are arranged to generate sound and receive back reflected sound. In an embodiment a sound frequency of forty megahertz is used. Although an example of a reflective configuration will be described wherein sound is applied to the fluid and received back from the fluid at substantially the same location, it should be appreciated that alternatively a transmissive configuration may be used or a reflective configuration with transmitter and receiver located at different position.

Sound generated by sensors 12a-d travels through the fluid the flows through conduit 10 and is reflected back, e.g. by the wall of the conduit, and received by sensors 12a-d. Sensors 12a-d detect the reflection. From the reflection an indication of the speed of sound in the fluid is determined, for example from a delay between transmission and reception of pulses of sound. The speed of sound in fluids depends on temperature. Changes in the speed of sound detected by each sensor 12a-d are indicative of passage of the heated portions adjacent the sensor 12a-d.

In an embodiment the delay between transmission and reception is measured of pulses produced after N multiple reflections of these pulses from the walls (where N=3 or for example), i.e. pulses that have travelled a plurality of times back and forth through the interior of conduit 10. This increases sensitivity. Sensors 12a-d may be integrated in the walls of conduit 10, but alternatively sensors 12a-d attached to the outside of the walls may be used. In a further embodiment, the thickness of the walls is chosen so that the time of travel of the pulses through the thickness of the wall is larger than the time of travel through the fluid in the interior of conduit 10. This makes in easy to distinguish pulses that have travelled through the fluid. Preferably the thickness of the wall is so large that the time of travel through the wall is larger than the time of travel N time back and fourth through the fluid in the interior of conduit 10, N being 3 or 4 for example. This simplifies detection of pulses the have travelled in this way.

Figure 3:
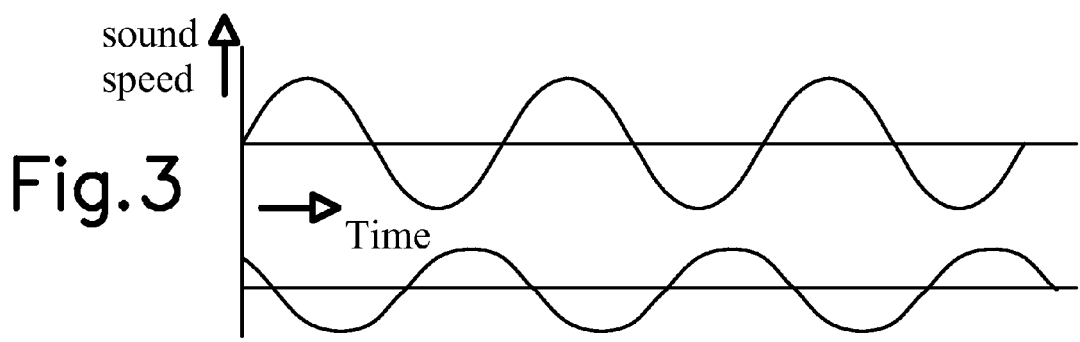
FIGS. 3 and 4 show sound speed as a function of time

FIG. 3 shows a theoretical measured sound speed as a function of time at two of the sensors 12c-d downstream from the focus region, for a sinusoidal time dependent laser irradiation intensity. As can be observed the phase of the changes in sound speed at the two sensors 12c-d is different. This is due to the time needed by a fluid portion to flow from a position adjacent the first sensor 12c to a position adjacent the second sensor 12d. The amplitude of the changes in sound speed also changes, due to heat diffusion effects.

Figure 4:
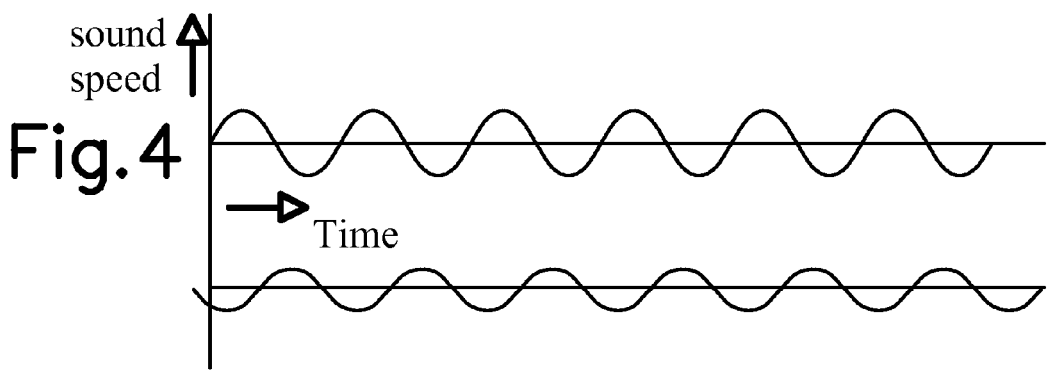

FIG. 4 also shows theoretical measured sound speed as a function of time at the same two sensors 12c-d, but for a sinusoidal time dependent laser irradiation intensity that has a higher temporal frequency. As can be observed, the frequency of sound speed changes is correspondingly higher. The amplitude of the changes in sound speed is smaller due to a relatively increased effect of heat diffusion.

Use of a heating pattern that is sinusoidal as a function of time has the advantage that heat diffusion can be accounted for because it has a predictable effect. In contrast, pulsed heating may make it more difficult to distinguish between the effects of fluid flow and diffusion, especially when the flow speed is small. As a result flows as small as $10^{-4}$ meter per second could be measured in a conduit of one millimeter diameter, that is, a flow volume of about one microliter per minute ($10^{-4} \times \frac{1}{6}$ cm$^3$/sec). With pulsed heating patterns the lower limit of measurable flow is much higher, typically 1 meter per second and at least $10^{-2}$ meter per second. Thus, the sinusoidal heating, combined with measurements at two downstream positions makes it possible to measure flow speeds in a range of $10^{-4}$ to $10^{-2}$ meters per second and more specifically in a range of $10^{-4}$ to $10^{-2}$ meters per second.

Figure 5:
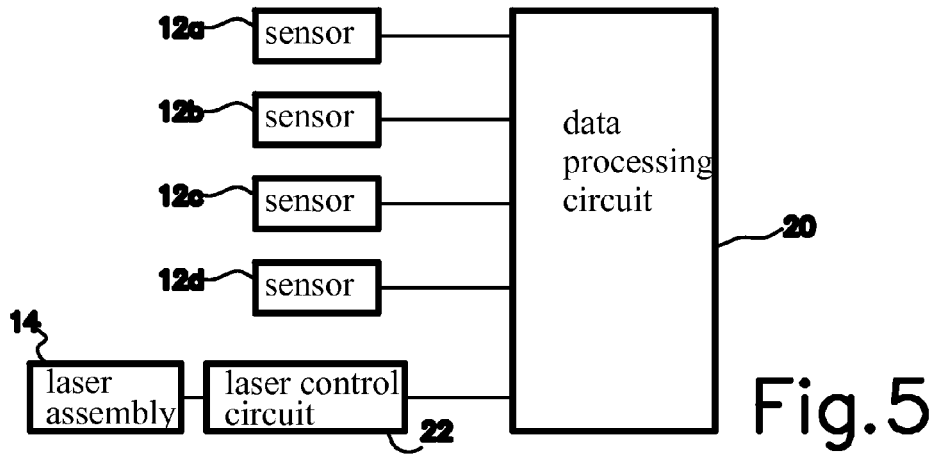
FIG. 5 shows a measurement circuit

FIG. 5 shows a measurement circuit. The circuit contains sensors 12a-d, a laser control circuit 22 and a data processing circuit 20 coupled to sensors 12a-d and laser control circuit 20. Data processing circuit 20 may a suitably programmed circuit, with I/O interface connections coupled to sensors 12a-d and laser control circuit 22. As used herein "circuit" includes both circuit structure per se and circuit structure combined with a program that programs the circuit structure to perform the required function. Data processing circuit 20 is configured to cause laser control circuit 22 to make laser assembly 14 generate laser radiation with a time dependent intensity, e.g. a sinusoidally time dependent intensity.

Furthermore data processing circuit 20 is configured to read results of sound speed measurements from sensors 12a-d and to process these results. In an embodiment, processing of the results comprises determining a phase difference between time variation of changes in sound speed indicated by the result, for the two sensors 12c-d downstream of the focus region. From the phase difference data processing circuit 20 computes the flow speed by dividing the (predetermined) distance between the two sensors 12c-d by the phase difference (this assumes that the phase difference is expressed as time difference between point of equal phase in the sound speed results from the sensors 12c-d; alternatively, when a fraction of the period of sinusoidal variation is used to express phase, data processing circuit divides a product of the distance and the frequency of the sinusoidal variation by the phase difference).

In a first embodiment, laser radiation with a sinusoidal time dependence of a predetermined fixed frequency is used. The fixed frequency defines a range of flow speeds that can be accurately measured. This range is limited for example due to the effects of heat diffusion. When heat transport due to heat diffusion becomes significant compared to heat transport due to fluid flow the accuracy of the simple relation between phase difference and flow speed is compromised. The range can be shifted to lower flow speeds by selecting a lower frequency of the sinusoidal variation of the intensity of laser irradiation. The maximum usable frequency is proportional to the square of volume flow of the fluid (and also proportional to fluid density and heat capacity and inversely proportional to thermal conductivity and the fourth power of conduit diameter). The definition of the range for a frequency can be realized for example by specifying a desired minimal accuracy and simulating operation to determine a range of flow speeds that can be measured with at least that accuracy with the frequency. Alternatively, an analytic analysis or calibration measurements may be used to determine the range.

In a second embodiment data processing circuit 20 is configured to adapt this frequency in response to the measurements. This is advantageous when the actual range of possible flow speeds is so large that it extends beyond any range of accurately measurable flow speeds defined by a single frequency.

Figure 6:
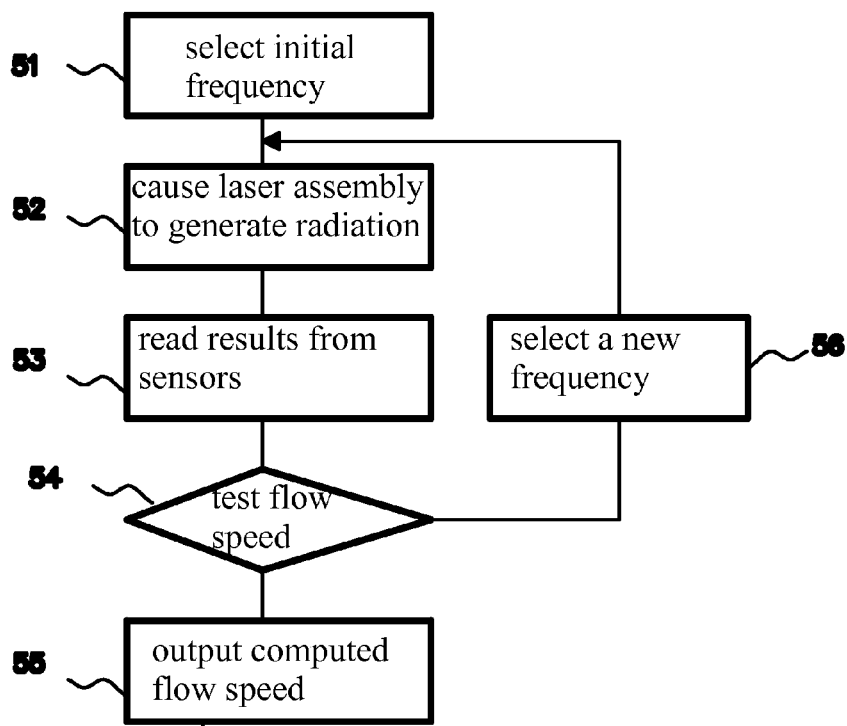
FIG. 6 shows a flow-chart of flow speed measurement

FIG. 6 shows a flow-chart of operations performed by data processing circuit 20. In a first step 51 data processing circuit 20 selects an initial frequency. In a second step 52 data processing circuit 20 causes laser assembly to generate radiation with a sinusoidally time dependent intensity. In a third step 53 data processing circuit 20 reads results from sensors 12$c,d$ and computes a flow speed from the results if possible. In a fourth step 54 data processing circuit 20 tests whether the flow speed, if any, is in a range defined by the selected frequency (typically a range wherein the selected frequency allows for measurements of at least a predetermined accuracy). If the flow speed is in said range data processing circuit 20 executes a fifth step 55, outputting the computed flow speed. If not, data processing circuit 20 executes a sixth step 56, selecting a new frequency so that its associated range is expected to cover the flow speed (e.g. on the basis of a provisional estimate from third step 53, using a pre-programmed quadratic dependence of acceptable frequency on flow speed, or by lowering the frequency until an acceptable frequency has been found) and returns to second step 52.

In an embodiment data processing circuit 20 is configured to execute tentative flow speed measurements for a plurality of different frequencies and to compare the results of the tentative flow speed measurements for different frequencies (by "tentative" it is meant that at least part of the measurement is performed, but that it may not be a faithful measurement of sound speed because a wrong heating frequency is used). In this embodiment data processing circuit 20 selects a frequency for which the tentative measurement result does not differ from the tentative measurement result for a nearest other frequency, or does not differ by more than a predetermined error margin (e.g. 1%, 5% or 10%) from this the tentative measurement result. Alternatively an average of results for a plurality of frequencies may be computed for which the tentative measurements do not differ by more than the predetermined error margin.

In an embodiment data processing circuit 20 may be configured to execute tentative flow speed measurements for a plurality of different frequencies successively, or by causing heating with a heating intensity as a function of time that is a combination of heating patterns of different frequency. In the latter case data processing circuit 20 may extract the responses to different frequencies from the response to the combination of heating patterns for example by Fourier analysis.

A wide range of frequency may be used for the heating patterns. In an embodiment frequencies in a range from 0.1 Hertz to 100 Hertz were used. In an embodiment it is avoided to use different frequencies wherein any used frequency is an integer multiple of another frequency that is used simultaneously. This reduces non-linear distortion that could reduce measurement accuracy. The simultaneous use of a wide range of unrelated frequencies may complicate detection of the responses at different frequencies.

In an embodiment the response to a combination of heating patterns is measured as a function of time in a time interval that may have a duration of less than a full period of the lowest frequency heating pattern. The measured response, that is, the sound speed values, may be sampled at a number of time points in that interval, for example at a sample rate of a thousand samples per second.

In this embodiment the measured response is processed in a number of steps. In a first step the response is measured during the time interval. In a second step a first order estimate of the amplitude and phase values of the frequency components of the response at the frequencies of the heating patterns is determined from the measured response in the interval. This may be done for example by multiplying the response with a time dependent phase vector for a frequency of the heating pattern and averaging (e.g. summing) the product over the measurement time interval. The first order estimate of the amplitude and phase value for the frequency may be derived from the average vector. This may repeated with the same measured response for the frequencies of all heating patterns.

In a third step the estimated response signals that are defined by the estimated amplitude and phase values are subtracted from the measured response. After the third step the second and third step are repeated a number of times, applied to the difference obtained in the previous third step instead of to the measured response, to obtain successively higher order corrections for the amplitude and phase values. A predetermined number of such repetitions may be executed, or the second and third steps may be repeated until the amplitude value of the correction for all frequencies has dropped below a threshold. Once the required number of such repetitions has been executed, for each frequency the first order estimate and the successive order of corrections are added, to obtain the amplitude and phase values for the frequency.

In this method, the higher frequency amplitude and phase values typically converge first, after which lower frequency amplitude and phase values can be estimated without distortion due to higher frequencies. This makes it possible to obtain accurate amplitude and phase values estimates using a measurement time interval of short duration, which may be of the same duration or even smaller duration as the period of the lowest frequency heating pattern.

The measured flow speed may be used to control selection of the initial frequency for subsequent messages. In an embodiment data processing circuit 20 increases the selected frequency if the measured flow speed has a value in a range associated with the increased frequency (e.g. where the increased frequency provides for sufficiently accurate flow speed measurement). Setting a higher frequency has the advantage of reducing the time needed for measurements.

Although embodiments have been described wherein a sinusoidal time dependence of the laser irradiation intensity is used, it should be appreciated that other forms of time dependence may be used. In one example a frequency band-limited time dependence is applied and the flow speed is determined from the delays with which this time dependence is observed at the sensors 12c,d. In a further embodiment time dependence may be changed to shift the band according to flow speed. In another embodiment band limitation is applied to signals from sensors 12c,d after measurement, dependent on the expected flow speed (e.g. by filtering using a low pass filter). In these embodiments the frequency of the flow-chart may be used to set the bandwidth.

One of the sensors 12b may be used to monitor heating. In an embodiment data processing circuit 20 controls the intensity of irradiation in a feedback loop using measurements obtained from this sensor 12b. The amplitude of intensity variation or the intensity itself may be controlled in feed back for example so that at least a predetermined sound speed variation is realized. Another one of the sensors 12a is used to detect backflow from changes in sound speed. When back flow is detected data processing circuit 20 may control a valve to adjust or interrupt the back flow for example.

In an embodiment a source of absorbing material is coupled to conduit 10, configured to release material that absorbs radiation from laser assembly 14. Thus, it is possible to measure flow speed also in fluids that do not themselves absorb radiation.

In another embodiment laser assembly 14 is omitted and a source of material that affects sound speed is added instead. In operation the source adds material into the flowing fluid at a time dependent rate, to provide a label instead of heating. Thus, flow speed can be measured. However, compared to this use of laser irradiation has the advantage that no contact between the focus region and the wall of the conduit is needed. Thus, effects of the conduit are eliminated.

Although embodiments have been shown wherein the time of flight is measured by measurements that depend on the speed of sound in the fluid, it should be appreciated that remote measurements of other properties may be used to determine the time of fligth, such as measurements that depend on the speed of light in the fluid.

As another alternative to a laser assembly other contactless heating techniques may be used, such as irradiation with a source of sound waves, an RF electromagnetic irradiation source, a microwave source a radioactive source etc. Also a resistive heating wire may be used, or if the fluid is electrically conductive, inductive heating may be used. In each case, the heat is preferably applied concentrated in a region away from the walls of conduit 10. Although a focussed source is preferred it should be appreciated that other sources may be used, e.g. a source that provides maximum intensity irradiation over a region with predetermined size and shape away from the walls.

The invention claimed is:

1. A fluid meter, comprising:
   a conduit;
   a heater configured to heat fluid at a heating location in the conduit;
   sensors configured to remotely measure a local property of the fluid that is dependent on local temperature of the fluid in fluid flowing in the conduit at a plurality of sensing locations downstream from said heating location;
   a data processing circuit configured:
   to cause the heater to heat the fluid simultaneously using a plurality of heating patterns of respective different-frequencies;
   to obtain measurements of said local property at the plurality of sensing locations, from the sensors during a predetermined time interval in which the local property at the plurality of sensing locations will be affected by said heating of the fluid by the heater due to fluid flow through the conduit;
   to compute phase and amplitude values of frequency components of variations of the property in said time interval for the respective different frequencies iteratively, with successive iterations to estimate corrections of the computed phase and amplitude values from said obtained measurements of the property at the plurality of sensing locations, from which estimates of the components obtained from a previous iteration have been subtracted; and
   to determine flow speed from differences between the phase values computed for a selected one of the frequencies or a selected range of the frequencies for respective ones of the sensing locations.

2. A fluid flow meter, according to claim 1, wherein the sensors are configured to measure speed of sound through the fluid transverse to a flow direction of the conduit.

3. A fluid flow meter according to claim 1, wherein the heater comprises a radiation source configured to heat the fluid in the conduit by absorption of radiation.

4. A fluid flow meter according to claim 1, wherein the heater is configured to generate a maximum intensity of irradiation in a region in the conduit that is separate from a wall of the conduit.

5. A fluid flow meter according to claim 1, wherein the heater comprises a laser.

6. A fluid flow meter according to claim 5, wherein the data processing circuit is configured:
   to execute tentative flow speed measurements for a plurality of different frequencies;
   to compare results of the tentative flow speed measurements for different frequencies; and
   to select the selected one of the frequencies or the selected range of the frequencies for use in determining the flow speed based on whether tentative measurements of flow speed from a frequency or frequency range does not differ more than by a predetermined difference from the tentative measurement of flow speed for another one of the frequencies, or frequency ranges of heating that is nearest to the selected frequency or frequency range among the frequencies, or frequency ranges of heating.

7. A method of performing a measurement of fluid flow, the method comprising:
   applying a fluid flow to a conduit;
   heating, by a heater, the fluid at a heating location in the conduit with a time-dependent heating strength simultaneously using a plurality of heating patterns of respective different frequency;
   remotely measuring a local property of the fluid that is dependent on local temperature of the fluid in fluid flowing in the conduit, the local property of the fluid being measured at a plurality of sensing locations downstream from said heating location in a predetermined time interval wherein the local property at a plurality of sensing locations is affected by said heating of the fluid by the heater due to fluid flow through the conduit;
   computing phase and amplitude values of frequency components of variations of the property in a time interval for the respective different frequencies iteratively, with successive iterations to estimate corrections of the computed phase and amplitude values from measurements of the property obtained from the step of remotely measuring, from which estimates of the components obtained from a previous iteration have been subtracted, and determining flow speed from differences between the phase values computed for a selected one of the frequencies or a selected range of the frequencies for respective ones of the sensing locations.

8. A method according to claim 7, wherein the local property is a speed of sound through the fluid transverse to a flow direction of the conduit.

9. A non-transitory computer program product for performing a measurement of fluid flow, the computer program product comprising instructions, which, when executed by a programmable computer cause the computer:

to cause a heater to heat the fluid simultaneously using a plurality of heating patterns of respective different frequency, to obtain measurements of a local property of the fluid that is dependent on local temperature of the fluid in fluid flowing in a conduit, the local property of the fluid being measured at a plurality of sensing locations downstream from said heating location during a predetermined time interval wherein the local property at a plurality of sensing locations is affected by said heating of the fluid by the heater due to fluid flow through the conduit, to compute phase and amplitude values of frequency components of variations of the property in said time interval for the respective different frequencies iteratively, with successive iterations to estimate corrections of the compute phase and amplitude values from the obtained measurements of the property from which estimates of the components obtained from a previous iteration have been subtracted, and to determine flow speed from differences between the phase values computed for a selected one of the frequencies or a selected range of the frequencies for respective ones of the sensing locations.

* * * * *